United States Patent [19]
Suzuki et al.

[11] Patent Number: 5,789,898
[45] Date of Patent: Aug. 4, 1998

[54] BATTERY HOLDING DEVICE FOR VEHICLE

[75] Inventors: Masahiro Suzuki; Nozomu Takata, both of Iwata, Japan

[73] Assignee: Yamaha Hatsudoki Kabushiki Kaisha, Iwata, Japan

[21] Appl. No.: 606,074

[22] Filed: Feb. 23, 1996

[30] Foreign Application Priority Data

Feb. 23, 1995 [JP] Japan .................. 7-035573

[51] Int. Cl.⁶ .................................................. H01M 10/44
[52] U.S. Cl. ......................... 320/2; 180/68.5; 429/100
[58] Field of Search ........................ 180/68.5; 320/2; 429/100, 99

[56] References Cited

U.S. PATENT DOCUMENTS 4,044,852  8/1977  Lewis et al. ................ 180/68.5
4,077,485  3/1978  Bonora et al. .............. 180/68.5
4,710,693  12/1987 Wigell ........................... 320/2
5,434,494  7/1995  Perego .......................... 320/2
5,477,936  12/1995 Sugioka et al. ............. 180/68.5

Primary Examiner—Peter S. Wong
Assistant Examiner—Gregory J. Toatley, Jr.
Attorney, Agent, or Firm—Knobbe, Martens, Olson & Bear LLP

[57] ABSTRACT

An electrically power assisted vehicle such as a bicycle and specifically a rechargeable battery holding arrangement for such vehicles. The vehicle is provided with a battery box that defines an internal opening for receiving a battery carrier and at least one battery carried thereby. A lid of the battery box carries a spring biased member engageable with the battery carrier for holding the battery carrier in the battery box when the lid is closed. Terminals are provided on the battery carrier and the battery box with the later terminal being disposed in the cavity so that the electrical connection to the vehicle is protected whether or not the battery carrier is in place.

19 Claims, 9 Drawing Sheets

BATTERY HOLDING DEVICE FOR VEHICLE

BACKGROUND OF THE INVENTION

This invention relates to a battery holding device for a vehicle and more particularly to an improved device for facilitating recharging of vehicle batteries and protection of the batteries and the electrical connections.

It has been proposed to provide a wide variety of vehicles with electric motor propulsion systems. The electric motor may either provide the total propulsion force for the vehicle or, alternatively, may provide merely electric power assist which supplements the operator's manual force. This type of arrangement is used in a number of vehicles and particularly in bicycles and other pedal-operated devices, although the application is not so limited.

With this type of device, as with most electric power operated vehicles, the batteries must be periodically recharged. The type of vehicle having this power arrangement and particularly those with electric power assist is normally not one which is stored in a garage and which may be stored at a point a considerable distance from a suitable and private electric power source.

In order to facilitate recharging of the batteries, therefore, it has been proposed to provide a battery arrangement whereby the battery may be easily disconnected from the vehicle and can be conveniently carried to a place where it can be recharged. Such an arrangement is shown in the co-pending application for United States Letters Patent assigned to the assignee hereof, entitled "Battery Holding Structure", Ser. No. 08/559,624, filed Nov. 20, 1995 in the names of Satoshi Ishikawa et al.

The arrangement shown in that patent application is very useful in that it does achieve the goals of protecting the battery and its terminals when in use, facilitating the operators carrying the battery to a place where it can be recharged and also permitting recharging when in the vehicle. However, this type of arrangement requires an electrical connector which is generally exposed and which receives a complimentary terminal carried by the battery carrying case and engageable when the battery case and enclosed batteries are installed to the vehicle. Thus, the terminals on the vehicle are exposed when the batteries and their carrying case are removed. This may place the terminals in a condition where corrosion can occur making subsequent electrical connections less than optimal.

It is, therefore, a principal object of this invention to provide an improved battery holding arrangement for a vehicle.

It is a still further object of this invention to provide an improved battery holding device for a vehicle wherein the battery and battery case, which can be removed as a unit, are protected when in use and also wherein the electrical terminals are protected regardless of whether the battery and battery case are in position or not.

It is a still further object of this invention to provide an improved battery holding structure for a vehicle wherein the holding structure can accommodate a separate battery carrier and contained batteries and will maintain good electrical connections when the battery carrier and contained batteries are received in the vehicle battery box.

SUMMARY OF THE INVENTION

This invention is adapted to be embodied in a battery arrangement for an electrically powered vehicle comprised of a battery box that is adapted to be affixed to the vehicle and which defines an internal cavity that is closeable by a selectively operable lid. A terminal is disposed within the internal cavity and is connected externally of the battery box to an electric motor of the vehicle. A battery carrier is detachably received in the battery box and contains an electric battery therein. The battery in the battery carrier is connected to a terminal of the battery carrier which terminal cooperates with the battery box terminal when received in the cavity to establish an electrical connection within the battery box.

DESCRIPTION OF THE PREFERRED EMBODIMENTS OF THE INVENTION

Figure 1:
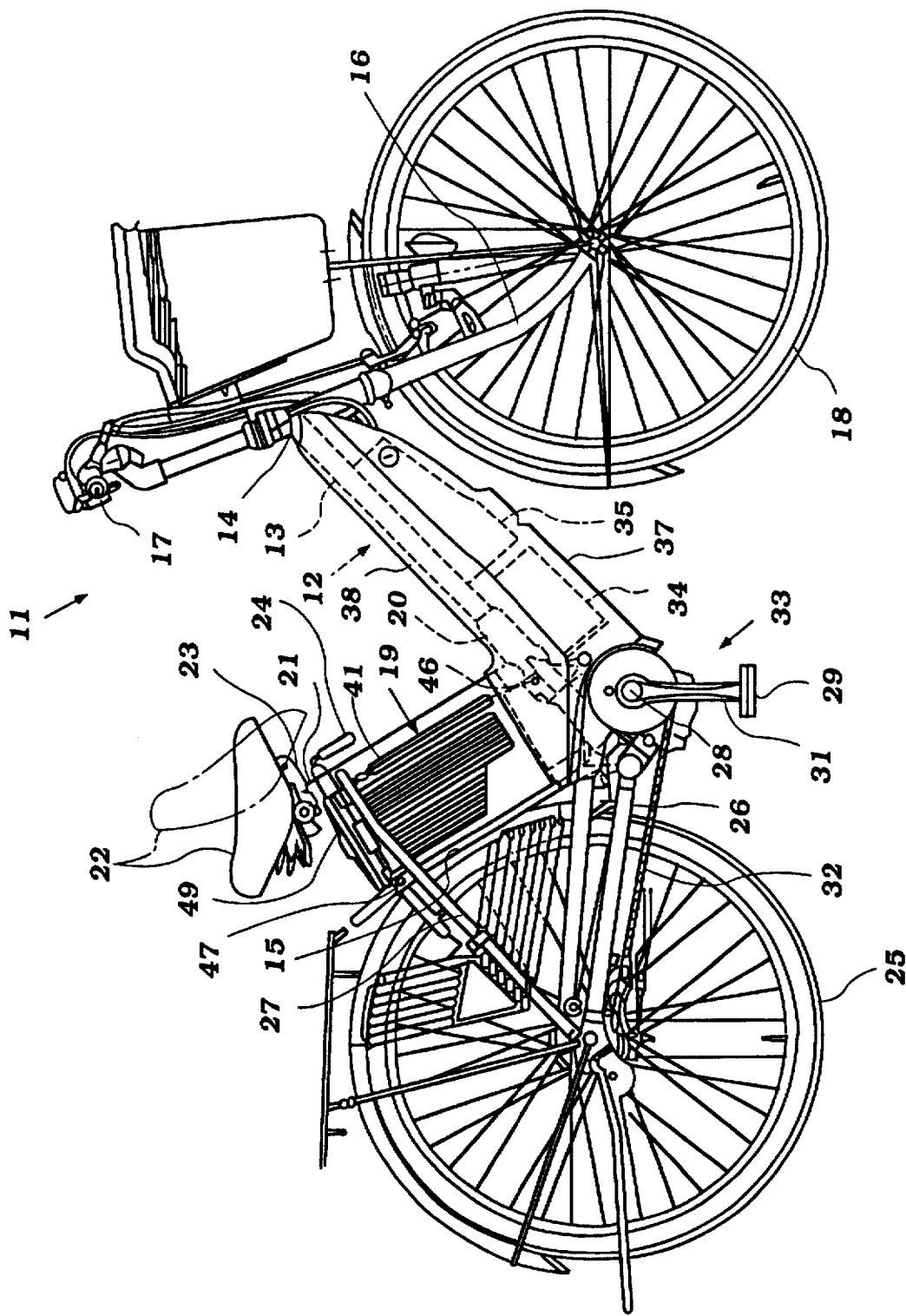
FIG. 1 is a right-side elevational view of an electrically power assisted bicycle constructed in accordance with an embodiment of the invention.

Referring now to the drawings and initially to FIG. 1, a bicycle constructed in accordance with an embodiment of the invention is indicated by the reference numeral 11. The bicycle 11 includes a frame assembly 12 consisting of a main spar 13. The main spar 13 extends forwardly and upwardly and is connected at its upper end to a head tube 14 while it is connected at its rearward end to an uptube 15 that extends generally upwardly and rearwardly. The head tube 14 journals a front fork 16 for dirigible motion on the control of a handlebar 17. A front wheel 18 is rotatably journaled by the front fork 16 in a known manner.

A seat pillar that is indicated by the reference numeral 19 is affixed to the rearward portion of the frame main spar 13 by means of a lug 20 and extends generally upwardly and rearwardly parallel to the uptube 15 and slidingly and telescopically receives a seat post 21 at its upper end. The seat post 21, in turn, is pivotally connected to a seat 22 provided for accommodating a rider by means of a seat pivot bracket 23. A handle 24 cooperates with a lock that is housed within the seat pillar 18 for controlling the position of the seat post 21 within the seat pillar 18 and thus the height of the seat 22.

A rear driven wheel 25 is rotatably journaled within the rearward ends of chain stays 26 which extend forwardly and are affixed to the rearmost portion of the main spar 13. Additionally, seat stays 27 are affixed to the rearward ends of the chain stays 26 and extend forwardly and upwardly for connection at their upper ends to the top of the seat pillar 18 immediately below the handle 24.

A crankshaft 28 is rotatably journaled within the lower portion of the frame 12. Pedals 29 are connected to the crankshaft 28 by means of crank arms 31. The crankshaft 28 is connected by a one way clutch (not shown) to a sprocket by a rider may drive the rear driven wheel through a chain 32.

Additionally, an electric motor assist powering unit assembly that is indicated by the reference numeral 33 is associated with the crankshaft 28 so as to provide power assist to the driving of the rear driven wheel 25. The powering unit assembly 33 consists of an electric motor 34 for driving the crankshaft 28, a controller 35 for regulating the power assist provided by the motor 34, and a battery arrangement 36 for powering the motor 34 and controller 35.

The electric motor 34 and controller 35 are housed within a lower housing 37 that is disposed underneath the main spar 13 of the frame 12 and is affixed to an upper housing 38 which is affixed to and surrounds the main spar 13, while the battery arrangement 36 is affixed to the uptube 15 and seat pillar 18. The transmission for transmitting the electric motor assist to the chain 32 and the operational strategy for the power assist may be of any known type.

Preferably the control may employ a sensor that senses the manual force applied by a rider to the pedals 29 or the torque applied to the crankshaft 28. The controller 35 then energizes the electric motor 34 at an appropriate amount to provide the desired assist. As noted, any known system may be employed for this purpose.

The battery arrangement 36 will now be discussed in detail. Since the batteries will require recharging on a regular basis, it is highly desirable to provide a battery arrangement whereby the batteries may be easily removed from the arrangement and conveniently carried to a location where they can be recharged. Such an arrangement is presented in the aforenoted copending application. In that arrangement, however, when the batteries are removed, certain electrical components which are affixed to the bicycle are exposed and may in extreme circumstances be damaged by corrosion, which will adversely affect the battery connection.

This invention eliminates this situation by providing a battery arrangement whereby all electrical connections are protected from the environment, even when the batteries are removed.

Referring now to FIGS. 2–4 and FIGS. 9–10, a battery box is indicated by the reference numeral 41 and defines an internal cavity in which is positioned a battery carrier 42, which will be described in detail later. The battery box 41 is composed of left and right sides 43 and 44, respectively. Formed from a suitable material such as a plastic. The sides are secured together by hook-type latches 45.

The battery box 41 is affixed to the bicycle 11 by means of bolts (not shown) that pass through openings within bosses 46 and 47 and bolt the battery box 41 to the main spar 13 and uptube 15, respectively, and also tend to pressingly engage two seat pillar engagement portions 48 of the battery box 41 along the rearward length of the seat pillar 19.

The upper end of the battery box 41 is composed of a selectively operable lid assembly that is indicated by the reference numeral 49 and covers the opening formed at the upper end of the cavity formed by left and right sides 43 and 44, respectively, of the battery box 41. The selectively operable lid assembly 49 is rotatably journaled upon bosses 51 formed at the upper end of the battery box right side 44 by pins 52 that rotatably journal further bosses 53 formed on a flange 54 of the selectively operable lid 49.

The selectively operable lid 49 is maintained in a closed position by a cylinder lock assembly 55 which is housed within the lid 49 and which operates an engagement claw 56 (FIG. 9) to pressingly engage a keeper 57 formed in the upper inside portion of the battery box left side 43. The lock assembly is key operated and can be unlocked by simply inserting the correct key into the tumbler mechanism and rotating the claw 56 such that it no longer engages the keeper 57.

A spring-biased pressing member is also housed within the selectively operable lid 49 and is indicated by the reference numeral 58. The spring-biased pressing member 58 consists of a pair of guides 59 that are affixed to the lower surface of the selectively operable lid 49 by a screw 61. A slide ring 62 slidingly engages each guide 59 and is pushed downwardly by a spring 63 that is mounted between the slide ring 62 and guide 59. As will be discussed later, the spring-biased pressing member 58 is used to properly position and retain the battery carrier 42 within the battery box 41.

A first electrical terminal is disposed at the lower end of the left-hand side 43 of the battery box 41 and indicated by the reference numeral 64. The first electrical terminal 64 consists of a male connector 65 that is affixed to the lower left side 43 by means of bolts 66. Male terminals 67 are disposed along the upper surface of the connector 65 and extend into the lower portion of the battery box cavity through a hole in the left side 43. At their lower ends, the male terminals 67 are connected to leads 68 that extend from the battery box 41 to the remaining components of the powering unit assembly 33, namely, the electric motor 34 through the controller 35.

A selectively closable opening is indicated by the reference numeral 69 and disposed along the upper portion of the left side 43 within an area whose exterior surface contains a design pattern 71 for improving the appearance of the battery box 41. The purpose of the selectively closable opening 69 will be discussed in detail later.

The battery carrier 42 will now be described in detail with reference to FIGS. 5–8. The battery carrier 42 is composed of left and right sides 72 and 73, respectively, formed from a suitable material such as a rigid plastic. The sides are affixed together by means of bolts 74 and house a battery pack that is indicated by the reference numeral 75. Rechargeable batteries 76 are disposed within the battery pack 75 and are connected to negative leads 77 at their negative poles and positive leads 78 at their positive poles.

The leads 77 and 78 pass to a second electrical terminal that is indicated by the reference numeral 79 and is formed in the lower surface of the left side 72 of the battery carrier 42. The second electrical terminal 79 consists of a female connector 81 on whose lower surface are disposed female terminals 82.

Figure 9:
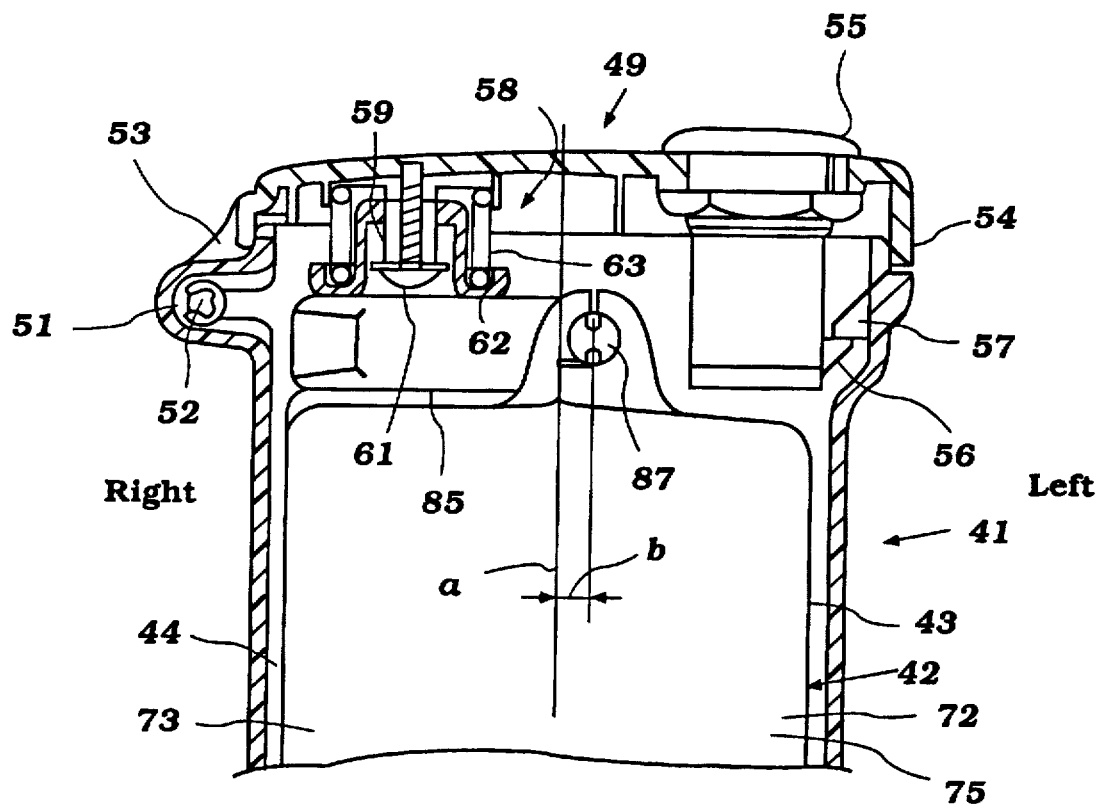
FIG. 9 is a cross-sectional view of the battery box taken along line 9—9 of FIG. 4 and showing the battery carrier in place.
Figure 10:
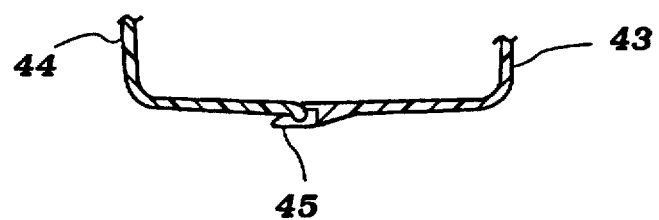
FIG. 10 is a cross-sectional view taken along line 10—10 of FIG. 3.

The leads 77 and 78 also are connected to a third electrical terminal 83 that is the recharging terminal for the battery arrangement 36. This recharging terminal 83 is disposed in an opening 84 formed in the upper portion of the left side 72 of the battery carrier 42. Lead retainers 80 are formed integrally on the interior of the side 72 of the battery carrier 42 for holding the leads 77 and 78 in place. A handle 85 is rotatably journaled within bosses 86 that are alternatively formed on the tops of the left and right sides 72 and 73, respectively, by means of pins 87. The pivot axis defined by the pivot pins 87 is offset to one side of the center "a" of the battery carrier 42 as seen in FIG. 9 by a distance "b". This permits the handle 85 to be folded only in one direction when in the battery box 36 if the lid 49 is to be closed. Thus the pressing member 58 will contact the handle 85 only when the handle 85 is properly folded.

If desired the handle 85 may be biased by springs like mouse trap type springs to its carrying position.

Figure 2:
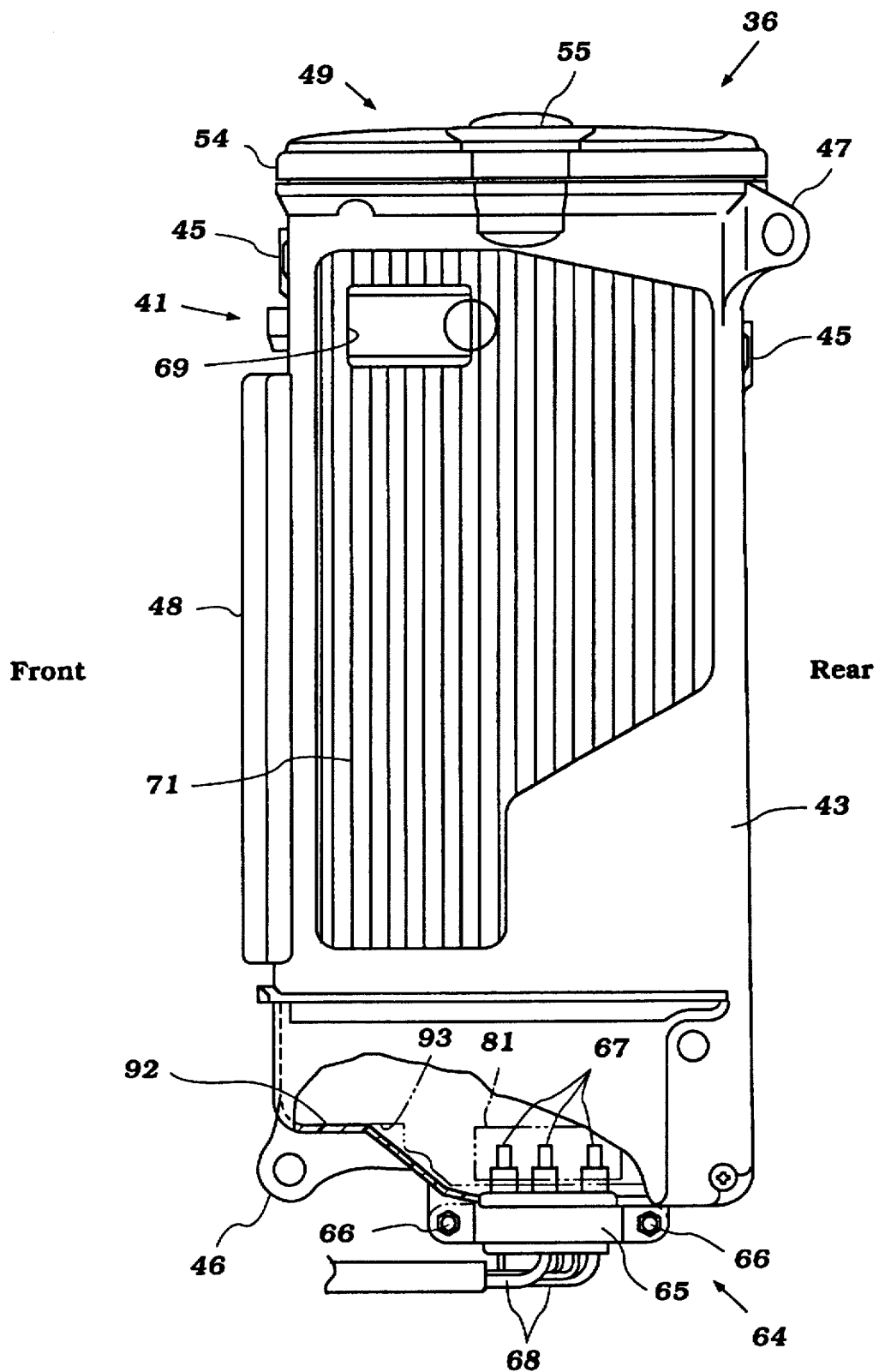
FIG. 2 is a left-side elevational view of a battery box with portions of the lower exterior surface removed to show a first electrical terminal.
Figure 3:
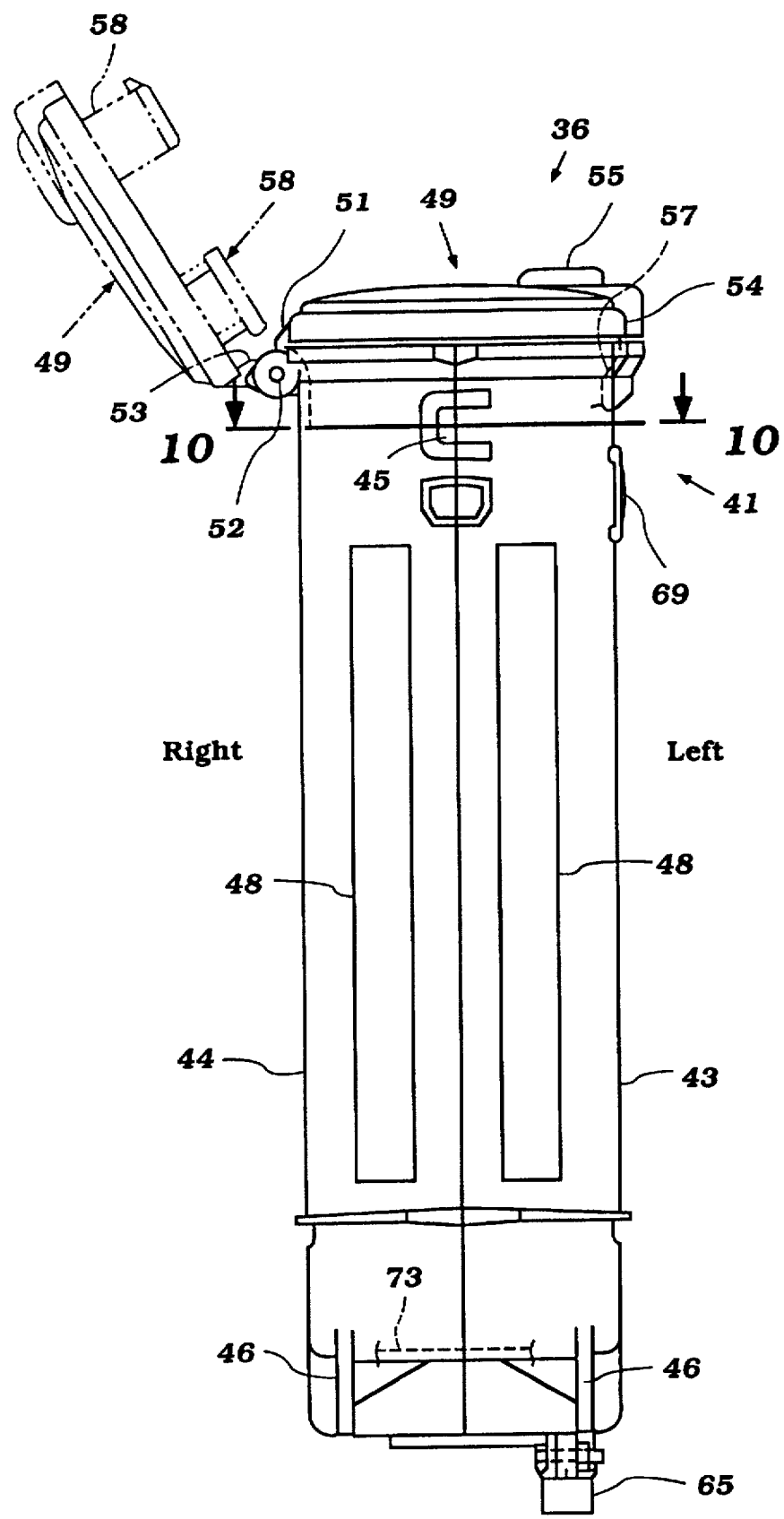
FIG. 3 is a front elevational view of the battery box showing the lid in a closed position in solid lines and in an opened condition in phantom lines.
Figure 4:
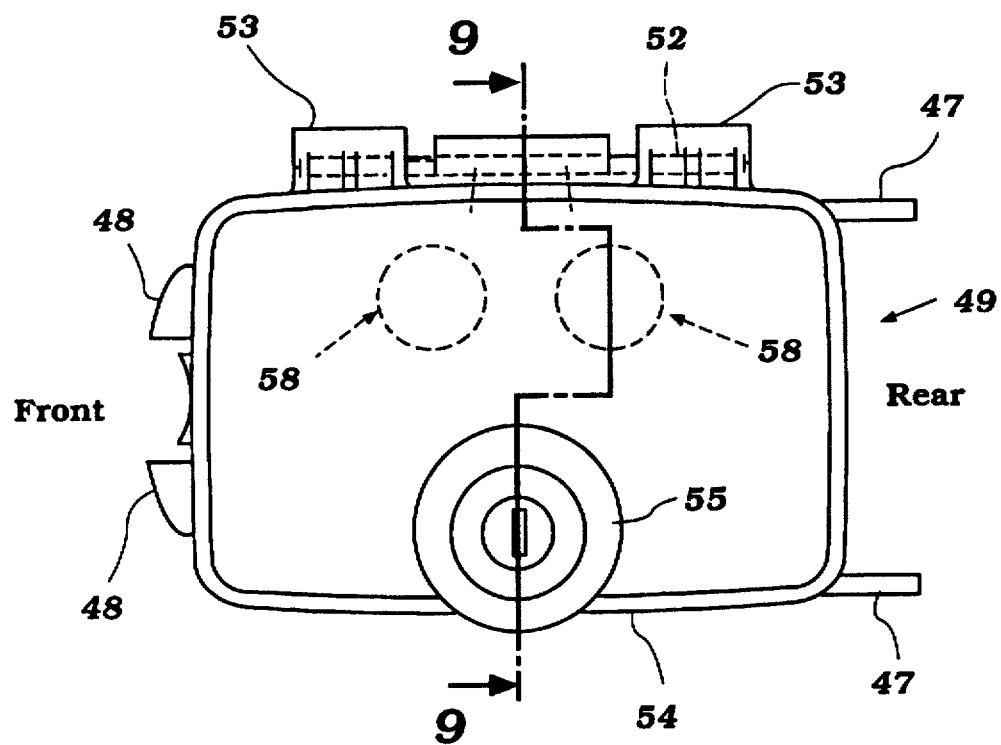
FIG. 4 is a top plan view of the battery box.
Figure 5:
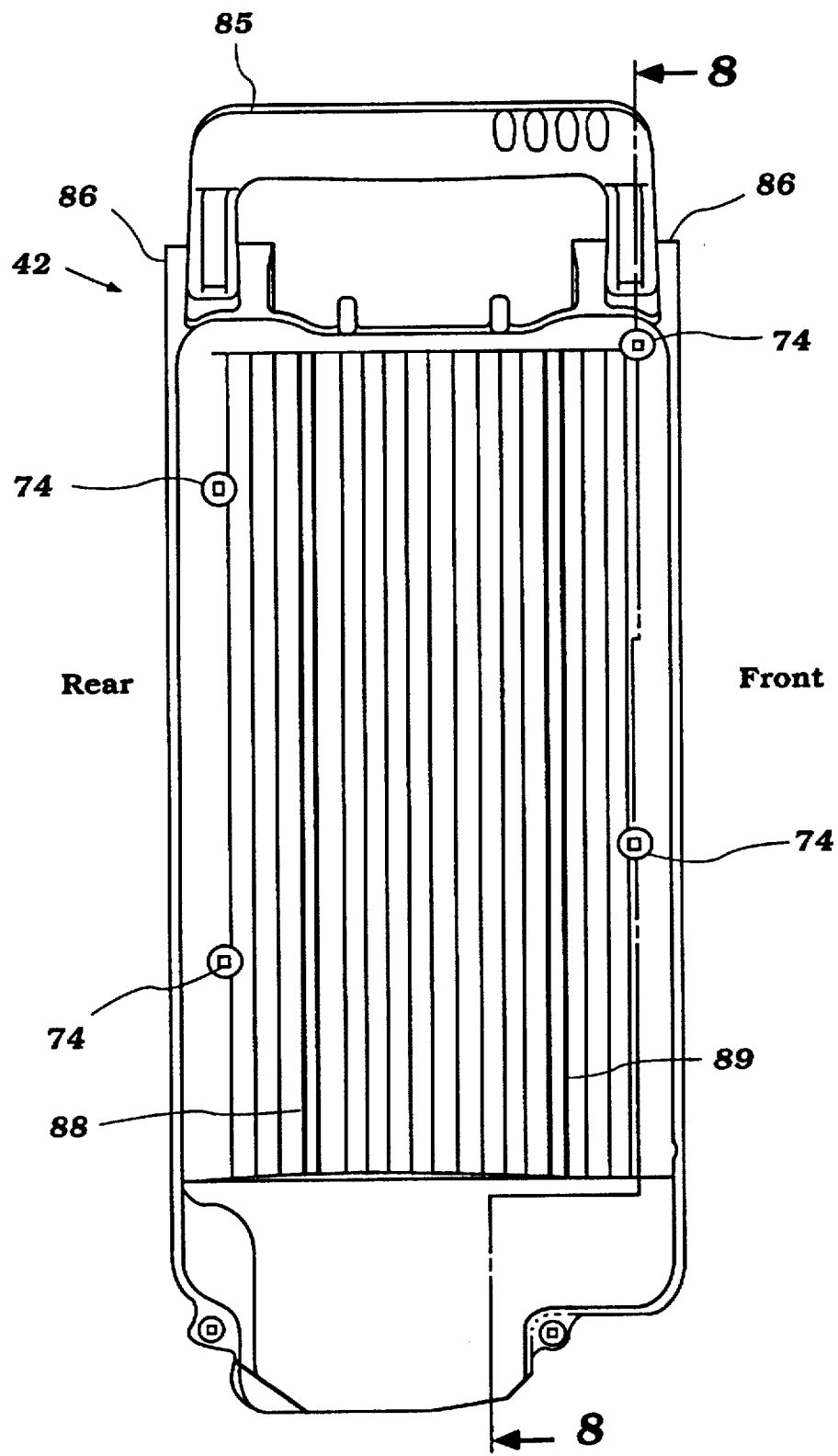
FIG. 5 is a right-side elevational view of a battery carrier cooperable with the vehicle battery box.
Figure 6:
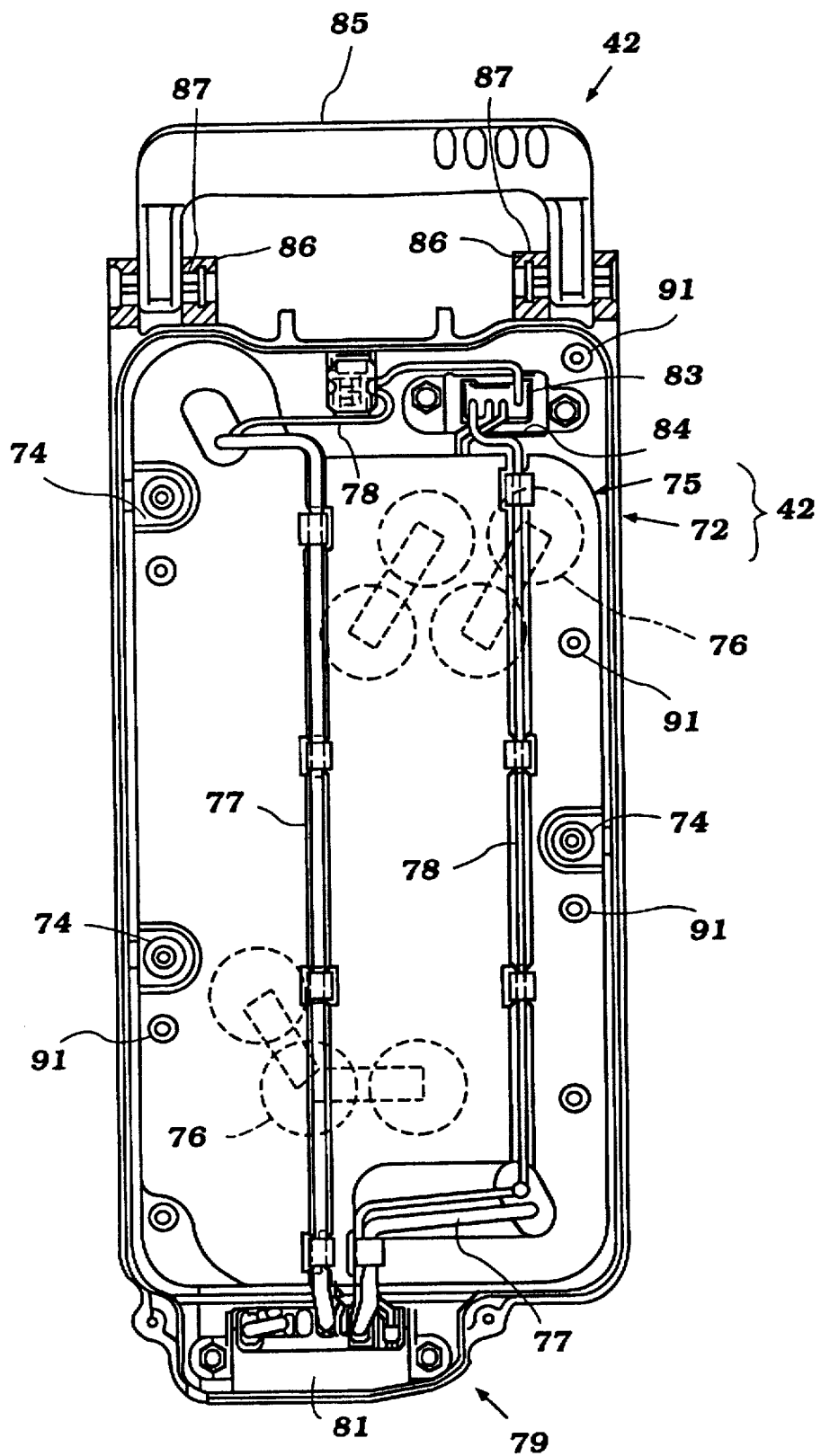
FIG. 6 is a right-side elevational view of the battery carrier with a portion of its exterior surface removed to show a second and a third electrical terminal and with batteries shown in phantom.
Figure 7:
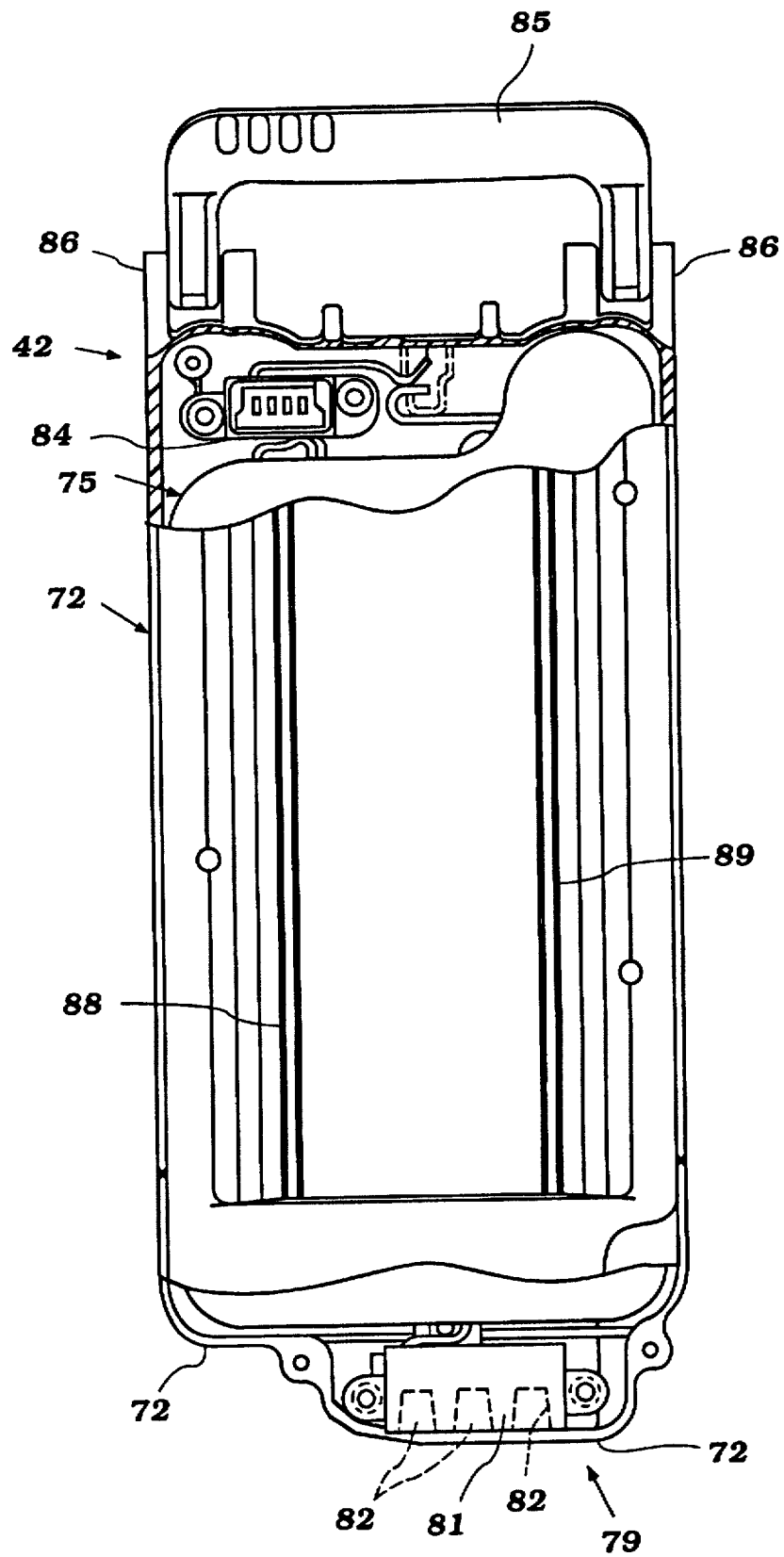
FIG. 7 is a left-side elevational view of the battery carrier with portions of the external surface removed to show the second and third electrical terminals.
Figure 8:
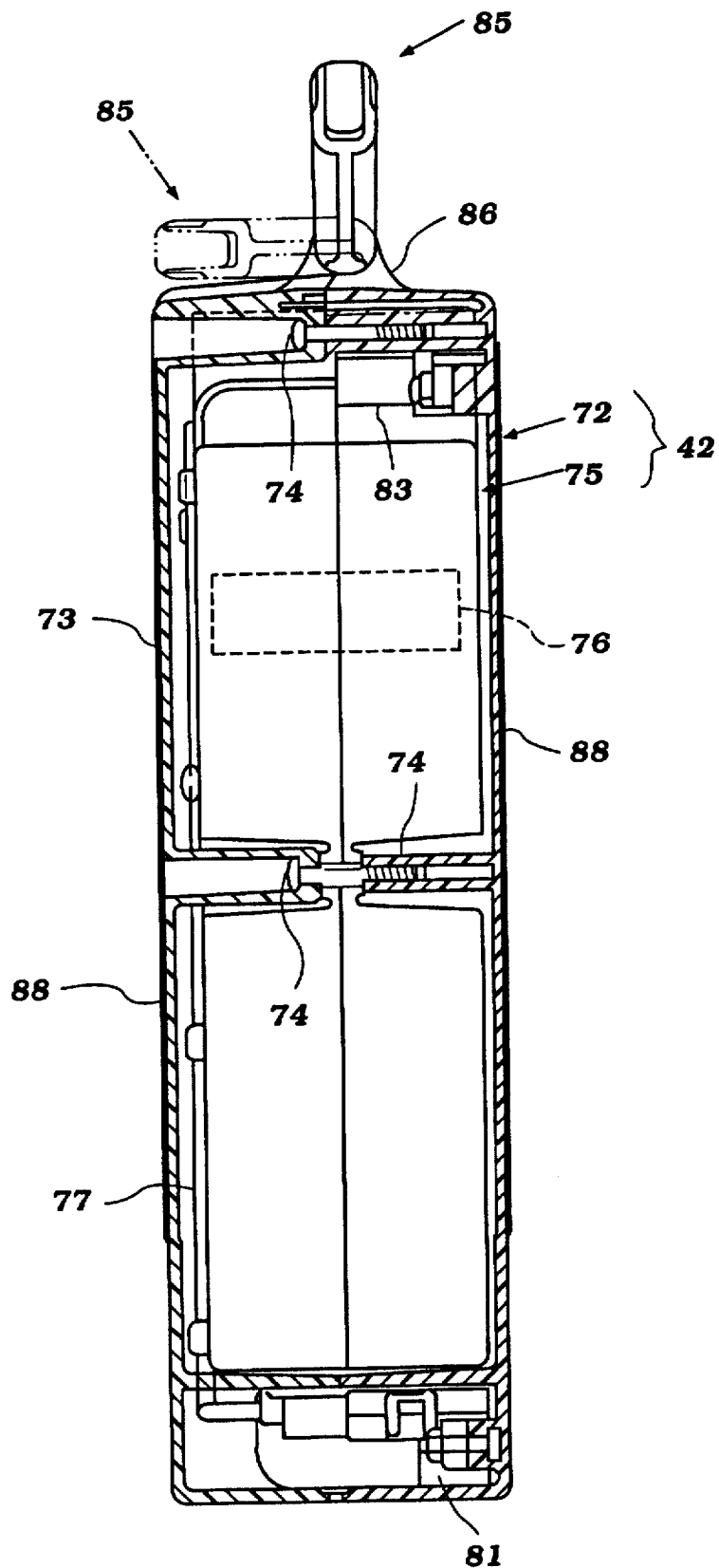
FIG. 8 is a cross-sectional view of the battery carrier taken along line 8—8 of FIG. 5.

Side covers 88 with ribs 89 fixed to the exterior surfaces of the battery carrier side pieces 72 and 73 by means of screws 91. The ribs 89 engage the interior sides of the battery box 41 to prevent relative movement while permitting removal and insertion. The lower surface 92 of the battery box 42 is formed with a step as seen in FIG. 2. The battery carrier 42 is formed with a complimentary notched lower surface 93 so that the battery carrier 42 can be fully received in the battery box 36 in an orientation so that the terminals 67 and 81 will be engaged. This also insures that the recharging terminal 83 will be aligned with the battery box opening 69 for recharging when installed in the bicycle 11.

The battery carrier 42 is positioned within the battery box 41 in the following manner. With the seat 22 and seat post 21 removed or, alternatively, with the seat 22 rotated forwardly about the seat pivot bracket 23, the selectively operable lid 49 of the battery box 41 can be opened by unlocking the cylinder lock 55. This allows access to the internal cavity of the battery box 41 into which is placed the battery carrier 42 by a rider holding the handle 85 and gradually lowering the battery carrier 42 until the first electrical terminal portion 65 of the battery box 41 contacts the second electrical terminal portion 79 of the battery carrier 42. The initial contact need not necessarily provide a complete connection between the first and second electrical terminals 65 and 79, respectively.

It should be noted at this point that if the battery carrier 42 is placed within the battery box 41 backwards, it will be immediately apparent, as it will not be possible to close the lid 49 since the top of the battery carrier 42 will extend out of the battery box 41. With the battery carrier 42 properly lowered into the battery box 41, the handle 85 is rotated downwards to the position shown in FIG. 9, and the selectively operable lid 49 is closed. When the lid 49 is closed, the spring-biased pressing member 58 is forced against the handle 85 and tends to push down on the battery carrier 42 such that the battery carrier is driven fully into the battery box 41 and a complete connection is established between the first and second electrical terminals 65 and 79.

Thus, the battery carrier 42 is securely mounted at its top and bottom surfaces within the battery box 41 and also along its sides, since the battery carrier side cover ribs 89 engage the inner surface of the left and right sides of the battery box 43 and 44, respectively, and is thus precluded from vibrating within the battery box 41. Also the handle 85 will be retained in its storage position.

With the battery carrier 42 installed in the battery box 41 as described above, the third electrical terminal 83 is in alignment with the selectively closable opening 69 formed in the battery box 41. Thus, the battery 76 may be recharged without removing the battery carrier 42 from the battery box 41 by affixing one end of an electrical power cord to the third electrical terminal 83 through the opening 69 and connecting the other end to any suitable external power source. Normally the opening 69 is closed and sealed by a suitable closure plug of any suitable type. This plug is removed for charging purposes.

It should be readily apparent that the above-described battery holding arrangement allows for the easy removal of the batteries for recharging in a manner whereby the electrical terminals are protected from the outside environment and also allows the batteries to be recharged without removing them from the arrangement. Of course, the foregoing description is that of preferred embodiments of the invention, and various changes and modifications may be made without departing from the spirit and scope of the invention, as defined by the appended claims.

What is claimed is:

1. A battery arrangement for an electrically powered vehicle comprised of a battery box adapted to be affixed to said vehicle and defining an internal cavity closed by a selectively operable lid, a first electrical terminal disposed within said internal cavity and connected externally of said battery box to an electric motor of the vehicle, and a battery carrier containing at least one battery detachably received in said cavity, said battery carrier having a second terminal electrically connected to the battery contained thereof and engageable with said first terminal for establishing an electrical connection therebetween solely upon receipt of said battery carrier in said cavity.

2. A battery arrangement for an electrically powered vehicle as set forth in claim 1, wherein the lid is pivotally supported on the battery box.

3. A battery arrangement for an electrically powered vehicle comprised of a battery box adapted to be affixed to said vehicle and defining an internal cavity closeable by a selectively operable lid pivotally supported on said battery box, a first electrical terminal disposed within said internal cavity and connected externally of said battery box to an electric motor of the vehicle, and a battery carrier containing at least one battery detachably received in said cavity, said batter carrier having a second terminal electrically connected to the batter contained thereof and engageable with said first terminal for establishing an electrical connection therebetween when said batter carrier is received in said cavity, said lid carrying a spring biased pressing member engageable with the battery carrier when said lid is closed for urging said first and said second terminals into their electrical connection.

4. A battery arrangement for an electrically powered vehicle as set forth in claim 3, wherein the battery carrier is provided with a pivotally supported handle for carrying of the battery carrier.

5. A battery arrangement for an electrically powered vehicle as set forth in claim 4, wherein the spring biased member carried by the lid is engageable with the handle of the battery carrier for further retaining the handle in a storage position when the battery carrier is contained within the battery box and the lid is in its closed position.

6. A battery arrangement for an electrically powered vehicle as set forth in claim 5, wherein the battery carrier is provided with a third terminal for receiving a charging electrical power source for charging the battery contained within said battery carrier.

7. A battery arrangement for an electrically powered vehicle as set forth in claim 6, wherein the battery box is provided with a selectively closeable opening aligned with the third terminal of the battery carrier when said battery carrier is received in said cavity for charging of the battery carried by said battery carrier without removing said battery carrier from said battery box.

8. A battery arrangement for an electrically powered vehicle comprised of a batter box adapted to be affixed to said vehicle and defining an internal cavity closeable by a selectively operable lid, a first electrical terminal disposed within said internal cavity and connected externally of said battery box to an electric motor of the vehicle, a battery carrier containing at least one battery detachably received in said cavity, said battery carrier having a second terminal electrically connected to the battery contained thereof and engageable with said first terminal for establishing an electrical connection therebetween when said battery carrier is received in said cavity, and said battery carrier being provided with a third terminal for receiving a charging electrical power source for charging the battery contained within said battery carrier, and when said first and said second terminals are electrically connected.

9. A battery arrangement for an electrically powered vehicle as set forth in claim 8, wherein the battery box is provided with a selectively closeable opening aligned with the third terminal of the battery carrier when said battery carrier is received in said cavity for charging of the battery carried by said battery carrier without removing said battery carrier from said battery box.

10. A battery arrangement for an electrically powered vehicle comprised of a battery box adapted to be affixed to said vehicle and defining an internal cavity closeable by a selectively operable lid, a first electrical terminal disposed within said internal cavity and connected externally of said battery box to an electric motor of the vehicle, and a battery carrier containing at least one battery detachably received in said cavity, said battery carrier having a second terminal electrically connected to the battery contained thereof and engageable with said first terminal for establishing an electrical connection therebetween when said battery carrier is received in said cavity, said vehicle being comprised of a bicycle having a frame assembly, a front wheel dirigibly supported at a forward end of said frame assembly, a driven wheel supported for rotation at the rear end of said frame assembly, said frame assembly providing a seat pillar carrying a seat for accommodating a rider, said battery box being disposed on one side of said seat pillar with the cavity thereof being disposed at least in part beneath said seat.

11. A battery arrangement for an electrically powered vehicle as set forth in claim 10, wherein the battery box is disposed behind the seat pillar.

12. A battery arrangement for an electrically powered vehicle as set forth in claim 10, wherein the lid is pivotally supported on the battery box.

13. A battery arrangement for an electrically powered vehicle as set forth in claim 12, wherein the lid carries a spring biased pressing member engageable with the battery carrier when said lid is closed for urging said first and said second terminals into their electrical connection.

14. A battery arrangement for an electrically powered vehicle as set forth in claim 13, wherein the battery carrier is provided with a pivotally supported handle for carrying of the battery carrier.

15. A battery arrangement for an electrically powered vehicle as set forth in claim 14, the spring biased member carried by the lid is engageable with the handle of the battery carrier for further retaining the handle in a storage position when the battery carrier is contained within the battery box and the lid is in its closed position.

16. A battery arrangement for an electrically powered vehicle as set forth in claim 15, the battery carrier is provided with a third terminal for receiving a charging electrical power source for charging the battery contained within said battery carrier.

17. A battery arrangement for an electrically powered vehicle as set forth in claim 16, wherein the battery box is provided with a selectively closeable opening aligned with the third terminal of the battery carrier when said battery carrier is received in said cavity for charging of the battery carried by said battery carrier without removing said battery carrier from said battery box.

18. A battery arrangement for an electrically powered vehicle as set forth in claim 10, wherein the battery carrier is provided with a third terminal for receiving a charging electrical power source for charging the battery contained within said battery carrier.

19. A battery arrangement for an electrically powered vehicle as set forth in claim 18, wherein the battery box is provided with a selectively closeable opening aligned with the third terminal of the battery carrier when said battery carrier is received in said cavity for charging of the battery carried by said battery carrier without removing said battery carrier from said battery box.

* * * * *

UNITED STATES PATENT AND TRADEMARK OFFICE
CERTIFICATE OF CORRECTION

PATENT NO.    : 5,789,898　　　　　　　　　　　　　　　　　　　　　　　　Page 1 of 1
DATED         : August 4, 1998
INVENTOR(S)   : Suzuki et al.

It is certified that error appears in the above-identified patent and that said Letters Patent is hereby corrected as shown below:

Column 6,
Line 38, please replace "batter" with -- battery --;
Line 39, please replace "batter" with -- battery --;
Line 41, please replace "batter" with -- battery --.

Column 7,
Line 2, please replace "batter" with -- battery --.

Signed and Sealed this

Twenty-seventh Day of August, 2002

Attest:

JAMES E. ROGAN
Attesting Officer　　　　Director of the United States Patent and Trademark Office